US012615404B2

(12) United States Patent
He

(10) Patent No.: US 12,615,404 B2
(45) Date of Patent: Apr. 28, 2026

(54) DATA PROCESSING METHOD BASED ON DVB, DVB DEVICE, AND READABLE STORAGE MEDIUM

(71) Applicant: Jueqing He, Guangzhou (CN)

(72) Inventor: Jueqing He, Guangzhou (CN)

( * ) Notice: Subject to any disclaimer, the term of this patent is extended or adjusted under 35 U.S.C. 154(b) by 122 days.

(21) Appl. No.: 18/625,160

(22) Filed: Apr. 2, 2024

(65) Prior Publication Data

US 2025/0106459 A1 Mar. 27, 2025

(30) Foreign Application Priority Data

Sep. 21, 2023 (CN) .......................... 202311227381.2

(51) Int. Cl.
| | |
|---|---|
| *H04N 21/20* | (2011.01) |
| *H04N 21/232* | (2011.01) |
| *H04N 21/258* | (2011.01) |
| *H04N 21/41* | (2011.01) |
| *H04N 21/422* | (2011.01) |
| *H04N 21/431* | (2011.01) |
| *H04N 21/433* | (2011.01) |
| *H04N 21/434* | (2011.01) |
| *H04N 21/436* | (2011.01) |
| *H04N 21/475* | (2011.01) |
| *H04N 21/482* | (2011.01) |
| *H04N 21/488* | (2011.01) |
| *H04N 21/61* | (2011.01) |
| *H04N 21/643* | (2011.01) |

(52) U.S. Cl.
CPC ... *H04N 21/4126* (2013.01); *H04N 21/25816* (2013.01); *H04N 21/4753* (2013.01); *H04N 21/4821* (2013.01)

(58) Field of Classification Search
None
See application file for complete search history.

(56) References Cited

U.S. PATENT DOCUMENTS

| | | | |
|---|---|---|---|
| 8,881,198 B2 * | 11/2014 | Seo .................... | H04N 21/4622 |
| | | | 725/62 |
| 2010/0037251 A1 * | 2/2010 | Lindhult .............. | H04N 21/235 |
| | | | 725/31 |
| 2016/0099938 A1 * | 4/2016 | Seo .................... | H04L 63/0869 |
| | | | 713/169 |

FOREIGN PATENT DOCUMENTS

| | | |
|---|---|---|
| CN | 104902311 A | 9/2015 |
| CN | 107071526 A | 8/2017 |
| CN | 108965908 A | 12/2018 |

* cited by examiner

*Primary Examiner* — Brian T Pendleton
*Assistant Examiner* — Jean D Saint Cyr
(74) *Attorney, Agent, or Firm* — Hemisphere Law, PLLC

(57) ABSTRACT

A data processing method based on DVB, a DVB device, and a readable storage medium are provided. In the data processing method, the DVB device is connected to a mobile terminal, so a user is allowed to watch TV programs on the mobile terminal. When a viewing request is sent, the DVB device analyzes the viewing request and feeds back a first program list. The user may directly select a first program from the first program list. If the user does not find a required program and performs a search operation, the DVB device requests a second program list from a server and matches search information with the second program list, and sends a matching result and the second program list to the mobile terminal. After receiving a second on-demand operation, the DVB device sends the data stream of the second program to the mobile terminal.

4 Claims, 3 Drawing Sheets

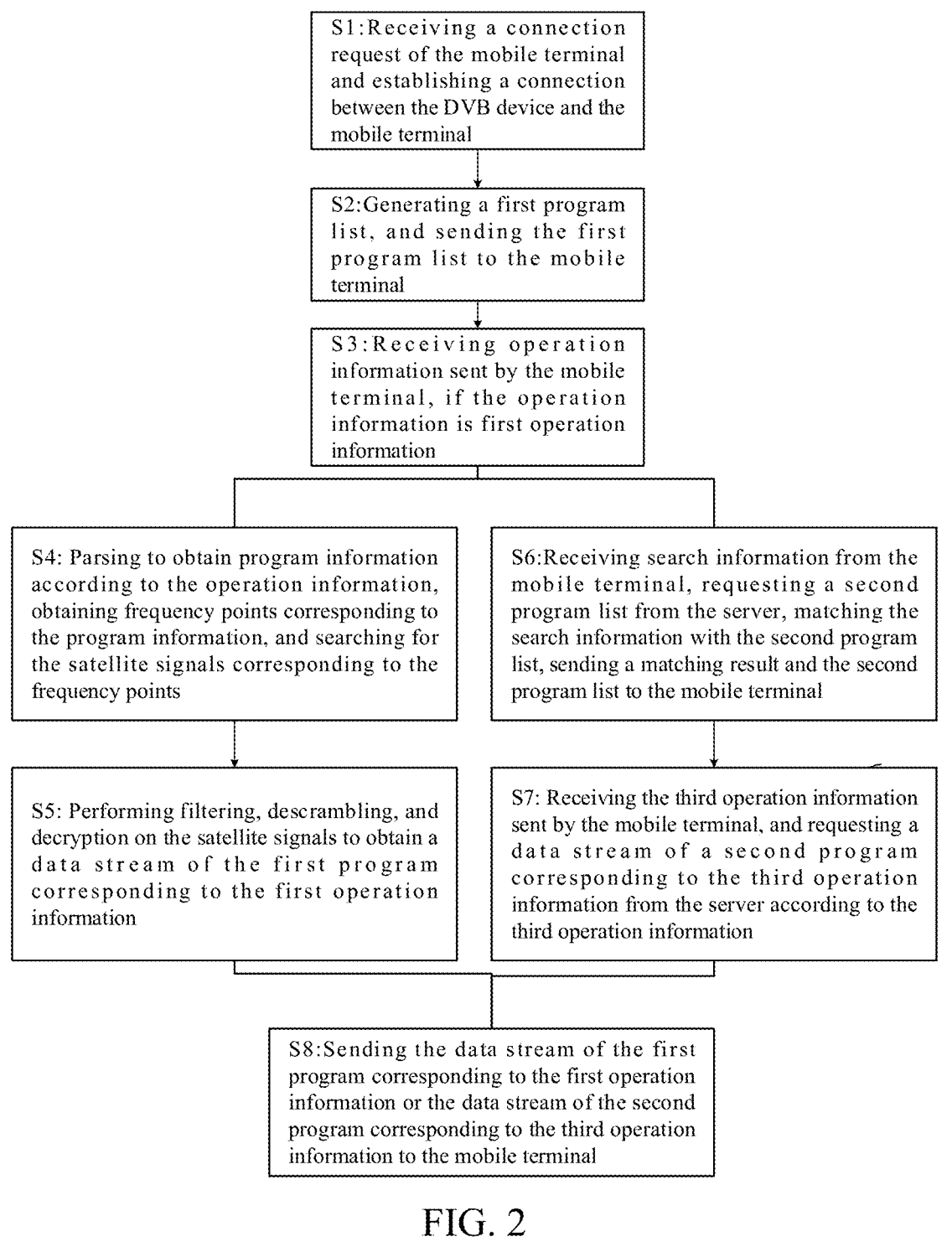

S1:Receiving a connection request of the mobile terminal and establishing a connection between the DVB device and the mobile terminal S2:Generating a first program list, and sending the first program list to the mobile terminal S3:Receiving operation information sent by the mobile terminal, if the operation information is first operation information S4: Parsing to obtain program information according to the operation information, obtaining frequency points corresponding to the program information, and searching for the satellite signals corresponding to the frequency points S6:Receiving search information from the mobile terminal, requesting a second program list from the server, matching the search information with the second program list, sending a matching result and the second program list to the mobile terminal S5: Performing filtering, descrambling, and decryption on the satellite signals to obtain a data stream of the first program corresponding to the first operation information S7: Receiving the third operation information sent by the mobile terminal, and requesting a data stream of a second program corresponding to the third operation information from the server according to the third operation information S8:Sending the data stream of the first program corresponding to the first operation information or the data stream of the second program corresponding to the third operation information to the mobile terminal

FIG. 2

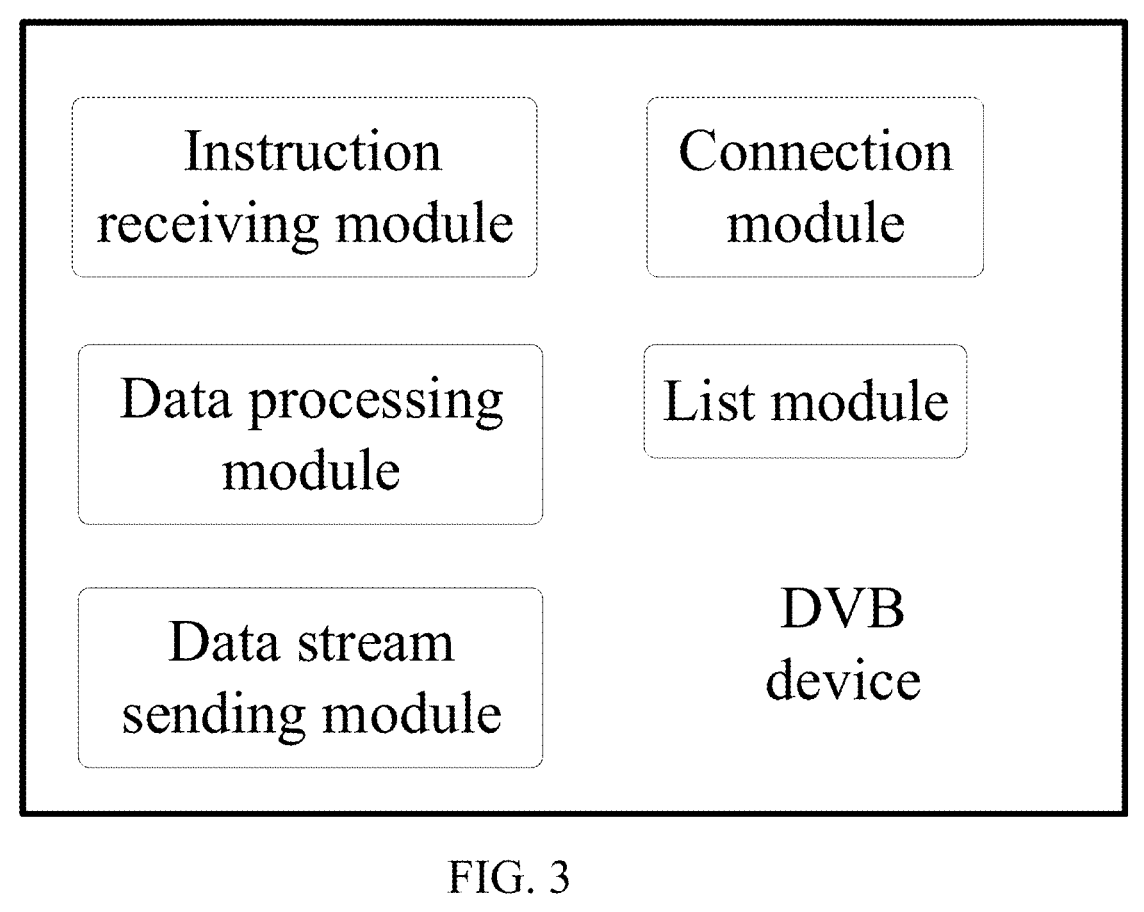

Instruction receiving module

Connection module

Data processing module

List module

Data stream sending module

DVB device

FIG. 3

DATA PROCESSING METHOD BASED ON DVB, DVB DEVICE, AND READABLE STORAGE MEDIUM

TECHNICAL FIELD

The present disclosure relates to a field of digital video broadcast (DVB), and in particular to a data processing method based on DVB, a DVB device, and a readable storage medium.

BACKGROUND

Digital satellite TV has developed rapidly in recent years, which uses geostationary satellites to transmit digitally coded and compressed TV signals to clients. Currently, there are two main methods to transmit the digitally coded and compressed TV signals to the clients. A first method is to transmit the digitally coded and compressed TV signals to cable TV stations, which then convert the digitally coded and compressed TV signals into analog programs and send them to the clients. The first method is widely used in countries around the world for many years. A second method is to transmit the digitally coded and compressed TV signals directly to the clients (that is, a direct-to-home (DTH) method). Direct TV, a company in America, is the first satellite TV operating company to apply DTH technology. Compared with the first method, the DTH method directly receives satellite signals {e.g., digitally coded and compressed TV signals) and is adopted by ordinary households.

In the prior art, the satellite signals are able to be directly received through a digital video broadcast (DVB) device to watch TV. However, with development of society, various digital signals are spread throughout the space and may interfere with each other. In addition, high-rise buildings also increase a difficulty of signal reception. In order to watch TV smoothly, a large satellite antenna is installed on the DVB device to receive signals. However, the large satellite antenna is larger in size and inconvenient to install. Moreover, antenna technology is applied to improve a signal receiving capability of the large satellite antenna. Even so, when the DVB device is placed indoors, there is still a problem of unstable signal receptions.

Moreover, with rapid development of Internet technology, people's reliance on mobile terminals has increased significantly. In daily life, people no longer pursue a visual experience of large screens, but focus on a convenience of watching TV on the mobile terminals. In the prior art, the mobile terminals are allowed to directly access TV resources through the network However, picture clarity is limited and viewing fluency is fluctuated with network conditions. Further, if watching TV programs on the mobile terminals through set-top boxes, problems such as unsmooth viewing and black screens may occur when the satellite signals are unstable. How to smoothly watch high-definition TV programs on mobile terminals such as mobile phones/tablets is an urgent technical problem that needs to be solved.

SUMMARY

Embodiments of the present disclosure provide data processing methods based on digital video broadcast (DVB), a DVB device, and a readable storage medium, which allow a user to watch TV smoothly even when satellite signals are unstable, thereby improving a user experience.

In a first aspect, the present disclosure provides a data processing method based on DVB that is applied to a DVB device. The data processing method comprises steps:

receiving a connection request of a mobile terminal and establishing a connection between the DVB device and the mobile terminal;

generating a first program list and sending the first program list to the mobile terminal;

receiving operation information sent by the mobile terminal;

if the operation information is first operation information, parsing to obtain program information according to the operation information, obtaining a frequency point corresponding to the program information, and searching for satellite signals corresponding to the frequency point; performing filtering, descrambling, and decryption on the satellite signals to obtain a data stream of a first program corresponding to the first operation information;

if the operation information is second operation information, receiving search information from the mobile terminal, requesting a second program list from a server, matching the search information with the second program list, sending a matching result and the second program list to the mobile terminal, receiving third operation information sent by the mobile terminal, and requesting a data stream of a second program corresponding to the third operation information from the server according to the third operation information; and sending the data stream of the first program corresponding to the first operation information or the data stream of the second program corresponding to the third operation information to the mobile terminal.

Furthermore, the first operation information and the third operation information are corresponding to on-demand operations. The second operation information is corresponding to a search operation.

Furthermore, the step of generating the first program list comprises:

obtaining a predetermined program list, searching for signal strengths of frequency points corresponding to predetermined programs in the predetermined program list, and using a program list including selected programs as the first program list.

Signal strengths of frequency points of the selected programs are greater than a first threshold.

Furthermore, the second program list comprises a first program sublist and a second program sublist. The first program sublist is a public program list. The second program sublist is a restricted program sublist.

Furthermore, the step of requesting the data stream of the second program corresponding to the third operation information from the server according to the third operation information comprises:

if the third operation information is associated with the first program sublist, directly requesting the data stream of the second program from the server; and if the third operation information is associated with the second program sublist, verifying whether a login account of the mobile terminal is bound, authenticating by the server according to a binding condition of the login account, and requesting the data stream of the second program from the server.

Furthermore, the step of verifying whether the login account of the mobile terminal is bound and authenticating by the server according to the binding condition of the login account comprise:

if it is verified that the login account of the mobile terminal is bound to the DVB device, sending related information of the DVB device to the server for authentication; and if it is verified that the login account of the mobile terminal is not bound to the DVB device, sending the login account of the mobile terminal to the server for authentication.

In a second aspect, the present disclosure provides a data processing method based on DVB that is applied to a mobile terminal. The data processing method steps:

scanning a quick-response (QR) code of a DVB device to establish a connection between the DVB device and the mobile terminal;

receiving and displaying a first program list, and monitoring an operation of a user;

receiving operation information sent by the mobile terminal;

if the operation of the user is a first on-demand operation, sending the first program data request information corresponding to the first on-demand operation to the DVB device, receiving and displaying a first data stream sent by the DVB device, where the first data stream is obtained by receiving, filtering, descrambling, and decrypting satellite signals by the DVB device; and if the operation of the user is a search operation, sending a search request to the DVB device, receiving a matching result and a second program list from the DVB device; if a second on-demand operation is performed, sending second on-demand operation information to the DVB device; receiving and displaying a second data stream sent by the DVB device; where the DVB device receives data stream information corresponding to a program corresponding to the second on-demand operation information sent by a serve, and the DVB device directly decrypts the data stream information to obtain the second data stream.

Furthermore, the second program list comprises a first program sublist and a second program sublist. The first program sublist is a public program list. The second program sublist is a restricted program sublist. After the step of sending the search request to the DVB device, receiving the matching result and the second program list from the DVB device, and if the second on-demand operation is performed, sending the second on-demand operation information to the DVB device, the data processing method further comprises:

if the second on-demand operation is associated with the first program sublist, sending second program data request information corresponding to the second on-demand operation to the DVB device; and if the second on-demand operation is associated with the second program sublist, sending information of a login account of the mobile terminal and the second program data request information corresponding to the second on-demand operation to the DVB device.

In a third aspect, the present disclosure provides a DVB device. The DVB device comprises a connection module, a list module, an instruction receiving module, a data processing module, and a data stream sending module.

The connection module is configured to receive a connection request of a mobile terminal and establish a connection between the DVB device and the mobile terminal.

The list module is configured to generate a first program list and send the first program list to the mobile terminal.

The instruction receiving module is configured to receive operation information sent by the mobile terminal.

The data processing module is configured to analyze the operation information received by the instruction receiving module.

If the operation information is first operation information, the data processing module parses the operation information to obtain program information, obtains a frequency point corresponding to the program information, searches for satellite signals corresponding to the frequency point, and performs filtering, descrambling, and decryption on the satellite signals to obtain a data stream of a first program corresponding to the first operation information.

If the operation information is second operation information, the data processing module receives search information from the mobile terminal through the instruction receiving module, requests a second program list from a server, matches the search information with the second program list, sending a matching result and the second program list to the mobile terminal, receives third operation information sent by the mobile terminal through the instruction receiving module, and requests a data stream of a second program corresponding to the third operation information from the server according to the third operation information.

The data stream sending module is configured to send the data stream of the first program corresponding to the first operation information or the data stream of the second program corresponding to the third operation information to the mobile terminal.

Correspondingly, the present disclosure further provides a computer device. The computer device comprises a processor, a memory, a network interfaces, an input device, and an output device. The processor is connected to the memory and the network interface. The network interface is configured to provide network communication functions. The memory is configured to store program codes. The input device is configured to receive input instructions to generate signal inputs related to settings and functional control of the computer device. The output device is configured to output data information. The processor is configured to call the program codes to execute the data processing methods in the embodiments of the present disclosure.

Correspondingly, the present disclosure further provides a readable storage medium. The readable storage medium comprises computer program stored therein. The computer programs comprise program instructions. The program instructions are executed by the processor and are configured to execute the data processing methods in the embodiments of the present disclosure.

In the embodiments of the present disclosure, the DVB device establishes the connection with the mobile terminal, so that the user is allowed to watch TV programs on the mobile terminal. Moreover, when the user sends a viewing request (i.e., the first on-demand operation), the DVB device analyzes the viewing request and feeds back the first program list. The user is able to directly select the first program he/she wants to watch from the first program list. Furthermore, if the user does not find a program he/she wants to watch and performs the search operation, the DVB device requests the second program list from the server, then the DVB device matches the search information with the second program list, and sends the matching result and the second program list to the mobile terminal. After receiving the second on-demand operation performed by the user on the second program list, the DVB device requests the data stream corresponding to the second program from the server, and sends the data stream of the second program to the mobile terminal, so that when there is a difficulty in receiving the satellite signals, the user is allowed to watch the TV programs smoothly on the mobile terminal. Moreover, the login account of the mobile terminal of the user is bound to the DVB device for verification, thereby authenticating viewing rights of the user. As a result, when the user uses another DVB device for viewing, the mobile terminal has same viewing rights, improving a use experience of the user.

BRIEF DESCRIPTION OF DRAWINGS

Accompanying drawings that form a part of the present disclosure are used to provide a further understanding of the present disclosure. The illustrative embodiments of the present disclosure and descriptions thereof are used to explain the present disclosure and do not constitute an improper limitation of the present disclosure.

In order to clearly describe technical solutions in the embodiments of the present disclosure, the following will briefly introduce the drawings that need to be used in the description of the embodiments or the prior art. Apparently, the drawings in the following description are merely some of the embodiments of the present disclosure, and those skilled in the art are able to obtain other drawings according to the drawings without contributing any inventive labor.

FIG. 2 is a flow chart of a data processing method according to one embodiment of the present disclosure.

FIG. 3 is a schematic diagram of a DVB device according to one embodiment of the present disclosure.

DETAILED DESCRIPTION

Figure 1:
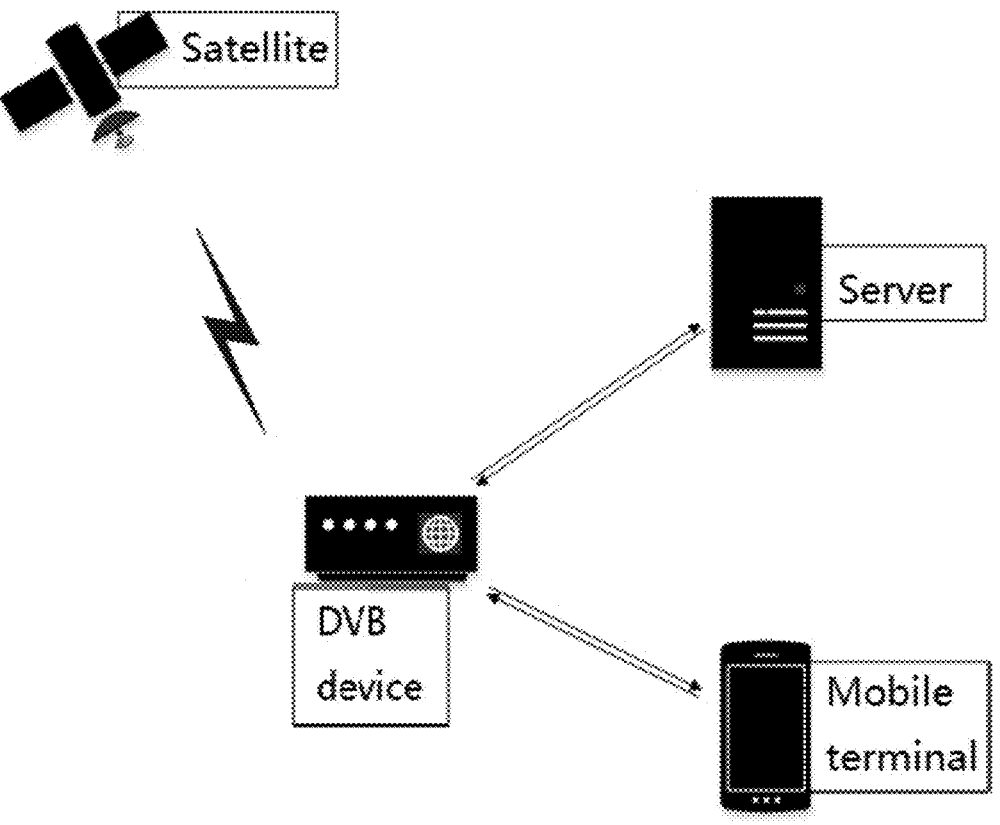
FIG. 1 is an architectural diagram of a data processing system according to one embodiment of the present disclosure.

Embodiments of the present disclosure provides a data processing method based on DVB. The DVB device establishes a connection with a mobile terminal, so that a user is allowed to watch TV programs on the mobile terminal. Specifically, when the user sends a viewing request, the DVB device analyzes the viewing request according to a current status and feeds back a first program list. The first program list is a program list corresponding to satellite signals directly received by the DVB device through a DVB antenna thereof. The user is able to directly select a first program he/she wants to watch from the first program list. Furthermore, if the user does not find a program he/she wants to watch and performs a search operation, the DVB device requests a second program list from a server. The second program list is a program list that is provided by the server other than the first program list. Then the DVB device matches the search information with the second program list, and sends the matching result and the second program list to the mobile terminal. After receiving the second on-demand operation performed by the user on the second program list, the DVB device requests a data stream corresponding to a second program from the server, and sends the data stream of the second program to the mobile terminal, so that when there is a difficulty in receiving the satellite signals, the user is allowed to watch the TV programs smoothly on the mobile terminal. In the embodiments of the present disclosure, programs provided by the DVB device and the server are displayed to the user through different program lists, so that when the user selects a specific program, the DVB device and server respond quickly and smoothly provide data to the user, which improves a viewing experience of the user.

Moreover, a login account of the mobile terminal of the user is bound to the DVB device for verification, thereby authenticating viewing rights of the user. As a result, when the user moves to a different place and uses another DVB device for viewing, the mobile terminal has same viewing rights, improving a use experience of the user.

The data processing methods provided by the embodiments of the present disclosure are introduced below with reference to the accompanying drawings.

FIG. 1 is an architectural diagram of a data processing system according to one embodiment of the present application. As shown in FIG. 1, the data processing system comprises a mobile terminal, a DVB device, and a server. The mobile terminal is wired or wirelessly communicated with the DVB device. The mobile terminal may be a smart phone, a tablet, a smart computer, etc., which is not limited thereto. The mobile terminal comprises a processing device and a display device. The display device has a display function.

In one embodiment, the server may be an independent physical server, a server cluster or a distributed system composed of physical servers, or a cloud server. The cloud server is configured to provide cloud service, cloud databases, cloud computing, cloud functions, cloud storage, network service, cloud communication, middleware service, domain name service, security service, content deliver network (CDN), as well as big data analysis, artificial intelligence platform, and other basic cloud computing services, which are not limited thereto Further, it is noted that a quantity of the servers is not limited thereto. The DVB device is communicates with the server through wired communication or wireless communication.

In one embodiment, the mobile terminal and the DVB device are wirelessly communicated through a wireless network. The mobile terminal and the DVB device are devices in a same local area network, so that the mobile terminal and the DVB device transmit data at higher speeds. Of course, a connection method between the mobile terminal and the DVB device is not limited thereto, and may be a wireless or wired connection method through BLUETOOTH, NFC, STAR FLASH, or a combination thereof.

In one embodiment, the DVB device comprises a processor, a modem, a decoder, a wireless network card, and the DVB antenna. The DVB devices is communicated with the server through wired or wireless methods. The DVB device comprises the DVB antenna configured to receive the satellite signals. The DVB antenna receives the satellite signals corresponding to the TV programs, and the processor processes the satellite signals to obtain a data stream for watching the TV programs.

The data processing methods provided by the present disclosure are different data processing methods based on operations of the user to ensure that the user uses the mobile terminal to watch the TV program he/she wants to watch under help of the DVB device. Further, different data sources are selected according to different TV programs to ensure the stability of watching.

FIG. 2 is a flow chart of a data processing method according to one embodiment of the present disclosure. The data processing method is executed by the DVB device. The data processing method comprises steps S1-S8.

The step S1 comprises receiving a connection request of the mobile terminal and establishing a connection between the DVB device and the mobile terminal.

A digital satellite TV system, also known as a DVB-S system or a DVB-S digital satellite TV system, is developed rapidly in recent years. The DVB-S system is a broadcast TV form that uses geostationary satellites to transmit digitally coded and compressed TV signals to clients. Currently, many countries in the world develop the DVB-S system. Core technology of the DVB-S system is universal MPEG-2 video and audio coding, and the DVB device is key equipment of the DVB-S system. The DVB device is configured to receive the satellite signals and process data. It is understood that the DVB device in the embodiment is configured to receive the satellite signals and process the data.

In some scenarios, the satellite signals are received through the DVB device, and after descrambling, decrypting, and data conversion, a final data stream is sent to the TV, so that the user can watch the TV programs he/or she wants to watch on the TV.

However, in other scenarios, the user prefers to watch the TV programs on the mobile phone. For instance, after finishing a day's work, the user wants to watch the TV programs in a more flexible and relaxed way. In this condition, advantages of the mobile terminal are brought into full play. When the user needs to watch the TV programs on the mobile terminal, he/she needs to establish the connection between the mobile terminal and the DVB device. Specifically, the user initiates a connection request in the mobile terminal. After receiving the connection request, the DVB device transmits a hotspot through the wireless network card so that the mobile terminal establishes a connection with the DVB device through the hotspot. It is understood that connecting the mobile terminal through a wireless network card is only one implementation method, which is not limited thereto. For instance, the mobile terminal and the DVB device are wirelessly communicated through BLU-ETOOTH, NFC, STAR FLASH, or the combination thereof. After the mobile terminal establishes the connection with the DVB device, the mobile terminal is able to obtain program lists and send different instructions as needed to perform a series of operations such as program selection and volume adjustment. Through wireless connection, the user is able to conveniently watch the TV programs through the mobile terminal.

The step S2 comprises generating a first program list, and sending the first program list to the mobile terminal.

The first program list refers to a program list corresponding to the satellite signals that the DVB device directly receives through the DVB antenna. It is understood that, after receiving the connection request of the user, the DVB device generates the program lists. However, since the DVB device may be placed at different places, the satellite signals, corresponding to different programs, that received by the DVB device are also different. Moreover, the environment where the DVB device is placed also affects a capability of the DVB device to receive the satellite signals. For instance, the satellite signals received by the DVB device placed beside the window are different with the satellite signals received by the DVB device placed in the bedroom.

In one embodiment, when the mobile terminal establishes a connection with the DVB device, the DVB device scans the satellite signals that are received to obtain a received program list and information related to wireless signals of frequency points corresponding to the received program list. The information related to wireless signals comprises but not limited to signal frequencies, signal strengths, and other information. The DVB device filters the satellite signals corresponding to the received programs to obtain the program list whose satellite signals meet predetermined conditions, and uses the program list as the first program list. It is understood that the first program list is the program list corresponding to the satellite signals that are directly received by the DVB device through the DVB antenna. Therefore, the DVB device is able to filter the satellite signals corresponding to the received programs. In the embodiment, the DVB device directly filters the satellite signals according to the signal strengths thereof and filters out the satellite signals whose signal strength are greater than the first threshold. The first threshold is predetermined as needed. In other embodiments, other parameters of the wireless signals or combinations thereof may also be used to filter the satellite signals to obtain the first program list. The DVB device sends the first program list to the mobile terminal in a wireless manner, and the first program list is displayed on the mobile terminal, so that the user is able to directly click a display screen (i.e., the display device) of the mobile terminal to perform the first on-demand operation. Moreover, since the first program list is filtered by the DVB device, the DVB device is allowed to receive program data of the first program list through the DVB antenna for subsequent processing, which not only quickly responds to the request of the user, but also ensures smooth receiving of corresponding date of the satellite signals. Thus, speed, fluency, and quality are ensured, and the user experience is improved.

In another embodiment, the DVB device is able to pre-determined a predetermined program list according to a region where the DVB device is located. When the mobile terminal of the user establishes the connection with the DVB device, the DVB device only searches for wireless signals corresponding to predetermined programs in the predetermined program list. In this way, a search burden of the DVB device is reduced and a search speed thereof is improved.

The Step S3 comprises receiving operation information sent by the mobile terminal, if the operation information is first operation information, executing the step S4, and if the operation information is second operation information, executing the step S6.

In one embodiment, the first operation information is corresponding to a first on-demand operation. The second operation information is corresponding to a search operation.

In one embodiment, after the DVB device sends the first program list to the mobile terminal, the DVB device continues to monitor feedback information (i.e., the first on-demand operation) from the mobile terminal. After receiving the first program list, the mobile terminal parses and displays programs corresponding to the first program list on the display screen for the user to select. If the user clicks on one of the programs (i.e., a first program) corresponding to the first program list to perform the first on-demand operation, it means that the user is willing to watch the first program. After receiving the first on-demand operation sent from the mobile terminal, the DVB device executes the subsequent step S4 to receive the satellite signals through the DVB antenna and performs subsequent processing. It is understood that when the user clicks on the first program to perform the first on-demand operation, the DVB device responds to the first on-demand operation of the user. Since the first program list is filtered by the DVB device according to its own conditions, when the user needs to watch the first program in the first program list, the DVB device responds directly and receives the satellite signals through the DVB antenna so that the user is allowed to watch the first program.

Furthermore, when the first program list is displayed on the mobile terminal, and the user finds that he/she does not wants to watch the programs corresponding to the first program list, the user may perform the search operation. Specifically, an operating software is installed in the mobile terminal. The operating software displays the first program list in a first interface area and displays a search box in a second interface area. Layouts of the first interface area and the second interface area are allowed to be changed as needed. When the user performs the search operation, the mobile terminal feeds back a search operation instruction to the DVB device. After receiving the search operation instruction, the DVB device continues to execute the step S6 and requests the second program list from the server. It is understood that when the user cannot find the program he/she wants to watch in the first program list, he may perform the search operation. The program to be searched is unable to be directly provided by the DVB device, so the DVB device needs to request a second program list from the server so that the user can watch more programs.

The step S4 comprises parsing to obtain program information according to the operation information, obtaining frequency points corresponding to the program information, and searching for the satellite signals corresponding to the frequency points.

When the user clicks on the first program list and performs the first on-demand operation, the DVB device responds to the first operation information fed back by the mobile terminal and parses information corresponding to the first program according to the first operation information. The information of the first program may comprise program name, program ID, corresponding frequency, etc. Specifically, the DVB device receives the first operation information from the mobile terminal and parses the information of the first program by searching a program information table. The program information table may be stored in the DVB device in advance or in the server, which is not limited therein. After parsing out the frequency point corresponding to the first program, the DVB device searches among the satellite signals and obtains all digital signals of the frequency point. The DVB device further filters the received satellite signals through the program ID of the first program and other information of the first program, and finally filters out the data stream of the first program.

It is understandable that in a digital TV, all videos, audios, texts, pictures, etc. are turned into data after digital processing and are packaged according to MPEG-2 (i.e., Moving Picture Experts Group-2) standards to form transmission packets having a fixed-length (188 bytes). The data packets are then multiplexed to form a transport stream (TS). Generally, one channel corresponds to one TS stream, and the TS stream of one channel comprises different programs and services. If there is no guidance information in the TS stream, a set-top box is unable to find a required code stream. Therefore, in the MPEG-2 standards, program specific information (PSI) is specifically defined. The PSI is to automatically set up and guide a receiver for decoding. The PSI is inserted into the TS stream through a multiplexer during multiplexing and is identified with a specific program ID. In order to enable the user to quickly find a required service in the TS streams, the PSI is expanded to obtain a service information (SI) table. The SI table is a description of all code streams in an entire system, describing data such as system transmission content, broadcast data stream arrangement, and schedule, etc. The SI table comprises the PSI. Each of sub-tables in the SI table is related to each other. As long as one piece of information in the SI table is known, other information in the SI table is known, so that the DVB device is allowed to filter out corresponding program data from a large number of digital signals.

The step S5 comprises performing filtering, descrambling, and decryption on the satellite signals to obtain a data stream of the first program corresponding to the first operation information, and executing the step S8.

In the digital TV, the TS stream of one channel consists of different programs and services, and one frequency point may carry data of different programs. Therefore, the DVB device is able to filter out the corresponding program data from the large number of digital signals based on various information in the SI table. Further, the DVB device performs descrambling and decryption on the corresponding program data to obtain a final data stream corresponding to the corresponding program, so that the mobile terminal plays the corresponding program based on the data stream thereof.

The mobile terminal comprises a tuner and a demodulator, and is able to perform soft decoding or hard decoding by a CPU thereof. However, the mobile terminal can only decode common video formats. For the TS streams in digital TV, the mobile terminal is unable to directly decode, which makes it very difficult to directly watch the TV programs through the mobile terminal.

In the embodiment of the present disclosure, the mobile terminal selects the first program of the first program list by connecting to the DVB device. Moreover, the mobile terminal is able to play the TV programs since the DVB device receives the satellite signals, which avoids the use of complex hardware and programs on the mobile terminal to support the digital signals, and enables the user to watch the TV programs directly on the mobile terminal.

The step S6 comprises receiving search information from the mobile terminal, requesting a second program list from the server, matching the search information with the second program list, sending a matching result and the second program list to the mobile terminal.

The second program list refers to all program lists stored in the server that provide services, excluding the first program list previously provided by the DVB device. It is understood that the programs in the first program list are the programs that are obtained directly by the DVB device through the DVB antenna, and other programs are obtained through the server. In one embodiment, the server may have stronger satellite signal reception capabilities, such as through an enhanced antenna or an external antenna. In another embodiment, the server may receive digital TV data through other wireless or wired methods.

In one embodiment, when the user does not find the program he/she wants to watch in the first programs list and performs the search operation, the mobile terminal feeds back the search operation instruction to the DVB device. After receiving the search operation instruction, the DVB device sends the first program list to the serve and requests the second program list from the server. When the DVB device obtains the second program list, the DVB device matches the search information of the mobile terminal with the second program list, and feeds back the matching result and the second program list to the mobile terminal.

It is understood that when the user performs the search operation on the mobile terminal, the matching result and the second program list are fed back by the DVB device. The operation software on the mobile terminal displays the second program list and highlight or individually displays the matching result in a third interface area to facilitate following operation of the user. If no program is matched, the mobile terminal notice the user with information such as "no result".

In one embodiment, the second program list comprises a first program sublist and a second program sublist. The first program sublist is a public program list. The second program sublist is a restricted program sublist. It is understandable that in the digital TV, different permissions are set for different programs. A most commonly used method is to classify the programs into free programs and paid programs. Different programs may also be classified in other ways, such as by the age of the users. In the embodiment, different programs are divided into the public programs and the restricted programs as an example. The second program list comprises the first program sublist and the second program sublist. The server sets different permissions for different programs in different sublists, and the permissions are authenticated by the DVB device or the mobile terminal.

For the programs in the first program sublist, only simple verification is required, that is, verifying whether data obtained by the DVB device or the mobile terminal is legal. If it is legal, the verification is passed, and the user is allowed to watch the programs in the first program sublist. It is understood that the programs in the first program sublist are the public programs, and as long as the user has subscribed to corresponding service, he or she can watch the programs in the first program sublist by a compliant device (i.e., the mobile phone). A specific identifier is pre-burned into the DVB device. The specific identifier is unable to be read. When the DVB device receives the satellite signals or the program data sent directly from the server, the DVB device needs to be authenticated based on the specific identifier to prevent criminals from directly descrambling and decrypting intercepted the satellite signal or the program data to watch the TV programs. In this way, it not only avoids the operator's interests being damaged, but also prevents the user from continuously obtaining the program data through illegal means, thus preventing the server from being overloaded. Since the specific identifier is burned into the DVB device in advance, the server only needs to encrypt the data streams of the programs in the first program sublist. A encryption method thereof is associated with the specific identifier. The DVB device is able to directly decrypt the program data after receiving it.

For the programs in the second program sublist, it is necessary to verify whether the user has access rights. Although the specific identifier burned into the DVB device is used for authentication, when a location of the user changes significantly and he/she still wants to watch the TV programs through the mobile terminal, at this time, it is impossible for the user to carry the DVB device with him/her. When the mobile terminal of the user is connected to another DVB device, since the specific identifier in another DVB device is used for authentication, the authentication fails and the TV programs are unable to be watched. It is understood that the user is able to use his/her own DVB device to watch the programs in the second program sublist at home and the DVB device has activated the corresponding permissions. When the mobile terminal of the user is connected to another DVB device, if the another DVB device is used for authentication, it leads to authentication failure.

In one embodiment, if third operation information is associated with the second program sublist, it is verified that whether a login account of the mobile terminal is bound to the DVB device. If it is verified that the login account of the mobile terminal is bound to the DVB device, relevant information of the DVB device is sent to the server for authentication. If it is verified that the login account of the mobile terminal is not bound to the DVB device, the login account of the mobile terminal is sent to the server for authentication. By adding verification of a binding relationship between the login account of the mobile terminal and the DVB device, a problem of being unable to watch the TV programs due to authentication failure when users changes the DVB devices is solved. It is understood that in a field of digital TV, since support from DVB device is required, the activation of permissions is generally associated with the DVB device. When the user uses the mobile terminal to connect to the DVB device that is commonly used, the user is able to bind the login account of the mobile terminal to the DVB device that is commonly used. In this way, when the user needs to watch the programs on the second program sublist, the DVB device has the permission and directly connects to the server for authentication. When the mobile terminal is connected to an unbound DVB device, if authentication is performed directly through the unbound DVB device, the authentication fails. Therefore, at this time, the login account of the mobile terminal is sent to the server, and the login account is used for authentication to avoid being unable to watch the TV program due to authentication failure caused by connecting to the unbound DVB device. By adopting different authentication methods for different situations, a protection of interests of the user is maximized and the user experience is improved.

The step S7 comprises receiving the third operation information sent by the mobile terminal, and requesting a data stream of a second program corresponding to the third operation information from the server according to the third operation information.

After the matching result that is highlighted or individually displayed is displayed on the operation software of the mobile terminal, the user clicks on the matching result to output the third operation information. The third operation information is a second on-demand operation. After receiving the third operation information, the DVB device parses and queries to obtain PSI of the second program corresponding to the third operation information, and requests the server for the data stream of the second program based on the PSI of the second program. It is understood that when the user selects the first program based on the first program list, the DVB device directly receives and process the satellite signals through the DVB antenna. When the user selects the second program based on the second program list, the DVB device is unable to obtain the data stream of the second program by itself. Therefore, the DVB device makes a request to the server and directly obtains the data stream of the second program through the server.

Through the data processing method of the embodiments of the present disclosure, the user is able to watch the TV programs more conveniently. The mobile terminal, the DVB device, and the server work together to intelligently select data sources when the user need to watch the TV programs, thus allowing the user to watch the TV programs smoothly.

The step S8 comprises sending the data stream of the first program corresponding to the first operation information or the data stream of the second program corresponding to the third operation information to the mobile terminal.

When the DVB device obtains the data stream of the first program or the data stream of the second program, the DVB device process the data stream of the first program or the data stream of the second program to send to the mobile terminal, so that the user is able to watch a required program through the mobile terminal.

Embodiments of the present disclosure further provide a data processing method based on DVB that is applied to the mobile terminal. The data processing method steps: A-B.

The step A comprises scanning a quick-response (QR) code of a DVB device to establish a connection between the DVB device and the mobile terminal. Specifically, the mobile terminal and the DVB device are wirelessly communicated through WIFI. Of course, the mobile terminal and the DVB device may be wirelessly communicated through BLUETOOTH, NFC, STAR FLASH, or the combination thereof, which is not limited thereto. It is understood that scanning the QR code of the DVB device is one implementation method, and the connection information may also be manually input, or a pairing operation may be performed manually to establish the connection between the mobile terminal and the DVB device, which is not limited thereto.

The step B comprises receiving and displaying a first program list, and monitoring an operation of a user.

Specifically, after the mobile terminal receives the first program list, a first interface area of an operation software of the mobile terminal displays the first program list. The mobile terminal detects an operation of the user in the first interface area. Moreover, the operation software of the mobile terminal also displays a search box in a second interface area, so that after the user does not find a TV program he/she wants to watch in the first program list, he/she is enabled to perform other operations. Similarly, the mobile terminal also detects an operation of the user in the second interface area. Layouts of the first interface area and the second interface area are allowed to be changed as needed, which are not limited thereto.

If the operation of the user is a first on-demand operation, the first program data request information corresponding to the first on-demand operation is sent to the DVB device, and the mobile terminal receives and displays a first data stream sent by the DVB device. The first data stream is obtained by receiving, filtering, descrambling, and decrypting satellite signals by the DVB device.

If the operation of the user is a search operation, the mobile terminal sends a search request to the DVB device, receives a matching result and a second program list from the DVB device, and receives and displays a second data stream sent by the DVB device. The DVB device receives data stream information corresponding to a program corresponding to the second on-demand operation information sent by a serve, and the DVB device directly decrypts the data stream information to obtain the second data stream.

In the embodiment of the present disclosure, when the user performs the search operation, the mobile terminal sends a search operation instruction to the DVB device. The DVB device matches a search result through the server based on the search operation instruction. If the user further performs a second on-demand operation on the second program with the search result, the DVB device requests the data stream of the second program from the server. The mobile terminal receives the data stream of the second program sent by the DVB device and displays accordingly, so that the user is able to watch the second program.

Furthermore, the second program list comprises a first program sublist and a second program sublist. The first program sublist is a public program list. The second program sublist is a restricted program sublist. After the step of sending the search request to the DVB device, receiving the matching result and the second program list from the DVB device, and if the second on-demand operation is performed, sending the second on-demand operation information to the DVB device, the data processing method further comprises:

if the second on-demand operation is associated with the first program sublist, sending second program data request information corresponding to the second on-demand operation to the DVB device; and if the second on-demand operation is associated with the second program sublist, sending information of a login account of the mobile terminal and the second program data request information corresponding to the second on-demand operation to the DVB device.

As shown in FIG. 3, FIG. 3 is a schematic diagram of the DVB device according to one embodiment of the present disclosure.

As shown in FIG. 3, the DVB device comprises a connection module, a list module, an instruction receiving module, a data processing module, and a data stream sending module. The connection module is configured to receive a connection request of a mobile terminal and establish a connection between the DVB device and the mobile terminal. The list module is configured to generate a first program list and send the first program list to the mobile terminal. The instruction receiving module is configured to receive operation information sent by the mobile terminal. The data processing module is configured to analyze the operation information received by the instruction receiving module.

If the operation information is first operation information, the data processing module parses the operation information to obtain program information, obtains frequency points corresponding to the program information, searches for satellite signals corresponding to the frequency points, and performs filtering, descrambling, and decryption on the satellite signals to obtain a data stream of a first program corresponding to the first operation information.

If the operation information is second operation information, the data processing module receives search information from the mobile terminal through the instruction receiving module, requests a second program list from a server, matches the search information with the second program list, sending a matching result and the second program list to the mobile terminal, receives third operation information sent by the mobile terminal through the instruction receiving module, and requests a data stream of a second program corresponding to the third operation information from the server according to the third operation information.

The data stream sending module is configured to send the data stream of the first program corresponding to the first operation information or the data stream of the second program corresponding to the third operation information to the mobile terminal.

Correspondingly, the present disclosure further provides a computer device. The computer device comprises a processor, a memory, a network interfaces, an input device, and an output device. The processor is connected to the memory and the network interface. The network interface is configured to provide network communication functions. The memory is configured to store program codes. The input device is configured to receive input instructions to generate signal inputs related to settings and functional control of the computer device. The output device is configured to output data information. The processor is configured to call the program codes to execute the data processing methods in the embodiments of the present disclosure.

In addition, one exemplary embodiment of the present disclosure further provides a readable storage medium. The readable storage medium comprises computer program stored therein. The computer programs comprise program instructions. The program instructions are executed by one or more processors and are configured to execute the data processing methods in the embodiments of the present disclosure, which is not repeatedly depicted therein. Moreover, the technical effects are not repeatedly depicted therein. It is understood that the program instructions may be deployed and executed on one computer device or computer devices communicated with each other.

The above-mentioned readable storage medium may be an internal storage unit of a computer device in the data processing method provided in any of the foregoing embodiments, such as a hard disk or memory of a computer device. The readable storage medium may also be an external storage device of the computer device, such as a plug-in hard disk, a smart memory card (SMC), a secure digital (SD) card equipped on the computer device, a flash card, etc. Further, the readable storage medium may also comprise both the internal storage unit of the computer device and the external storage device. The readable storage medium is configured to store the computer programs and other programs and data required by the computer device. The readable storage medium ifs further configured to temporarily store data that has been output or is to be output.

The steps in the methods of the embodiments of the present disclosure can be sequentially adjusted, combined, and removed according to actual needs.

Modules in the device of the embodiments of the present disclosure can be merged, divided, and removed according to actual needs.

The above disclosed embodiments are only some embodiments of the present disclosure, and of course cannot be used to limit the scope of the present disclosure. Those of ordinary skill in the art can understand all or part of the processes for implementing the above embodiments and making equivalent changes based on the claims of the present disclosure, which shall fall within the scope of the present disclosure.

What is claimed is:

1. A data processing method based on DVB, applied to a mobile terminal, comprising steps:

scanning a quick-response (QR) code of a DVB device to establish a connection between the DVB device and the mobile terminal;

receiving and displaying a first program list, and monitoring an operation of a user;

receiving operation information sent by the mobile terminal;

if the operation of the user is a first on-demand operation, sending the first program data request information corresponding to the first on-demand operation to the DVB device, receiving and displaying a first data stream sent by the DVB device, wherein the first data stream is obtained by receiving, filtering, descrambling, and decrypting satellite signals by the DVB device; and if the operation of the use is a search operation, sending a search request to the DVB device, receiving a matching result and a second program list from the DVB device; if a second on-demand operation is performed, sending second on-demand operation information to the DVB device; receiving and displaying a second data stream sent by the DVB device; wherein the DVB device receives data stream information corresponding to a program corresponding to the second on-demand operation information sent by a serve; and the DVB device directly decrypts the data stream information to obtain the second data stream;

wherein the second program list comprises a first program sublist and a second program sublist; the first program sublist is a public program list: the second program sublist is a restricted program sublist;

wherein after the step of sending the search request to the DVB device, receiving the matching result and the second program list from the DVB device; if the second on-demand operation is performed, sending the second on-demand operation information to the DVB device, the data processing method further comprises:

if the second on-demand operation is associated with the first program sublist, sending second program data request information corresponding to the second on-demand operation to the DVB device; and if the second on-demand operation is associated with the second program sublist, sending information of a login account of the mobile terminal and the second program data request information corresponding to the second on-demand operation to the DVB device.

2. A non-transitory readable storage medium, comprising: computer programs stored therein; wherein the computer programs comprise program instructions; the program instructions are executed by a processor and are configured to execute the data processing method according to claim 1.

3. The data processing method based on DVB according to claim 1, wherein after the step of receiving and displaying a first program list, further comprises:

displaying the first program list in a first interface area of the mobile terminal, and displaying a search box in a second interface area of the operation software.

4. The data processing method based on DVB according to claim 3, wherein after the step of if the operation of the use is a search operation, sending a search request to the DVB device, receiving a matching result and a second program list from the DVB device, further comprises:

displaying the second program list and the matching result in a third interface area of the operation software.

* * * * *